Sept. 24, 1963
A. L. DOUGHERTY ETAL
3,104,757
SCREW CONVEYOR COUPLING
Filed Oct. 20, 1960
2 Sheets-Sheet 1
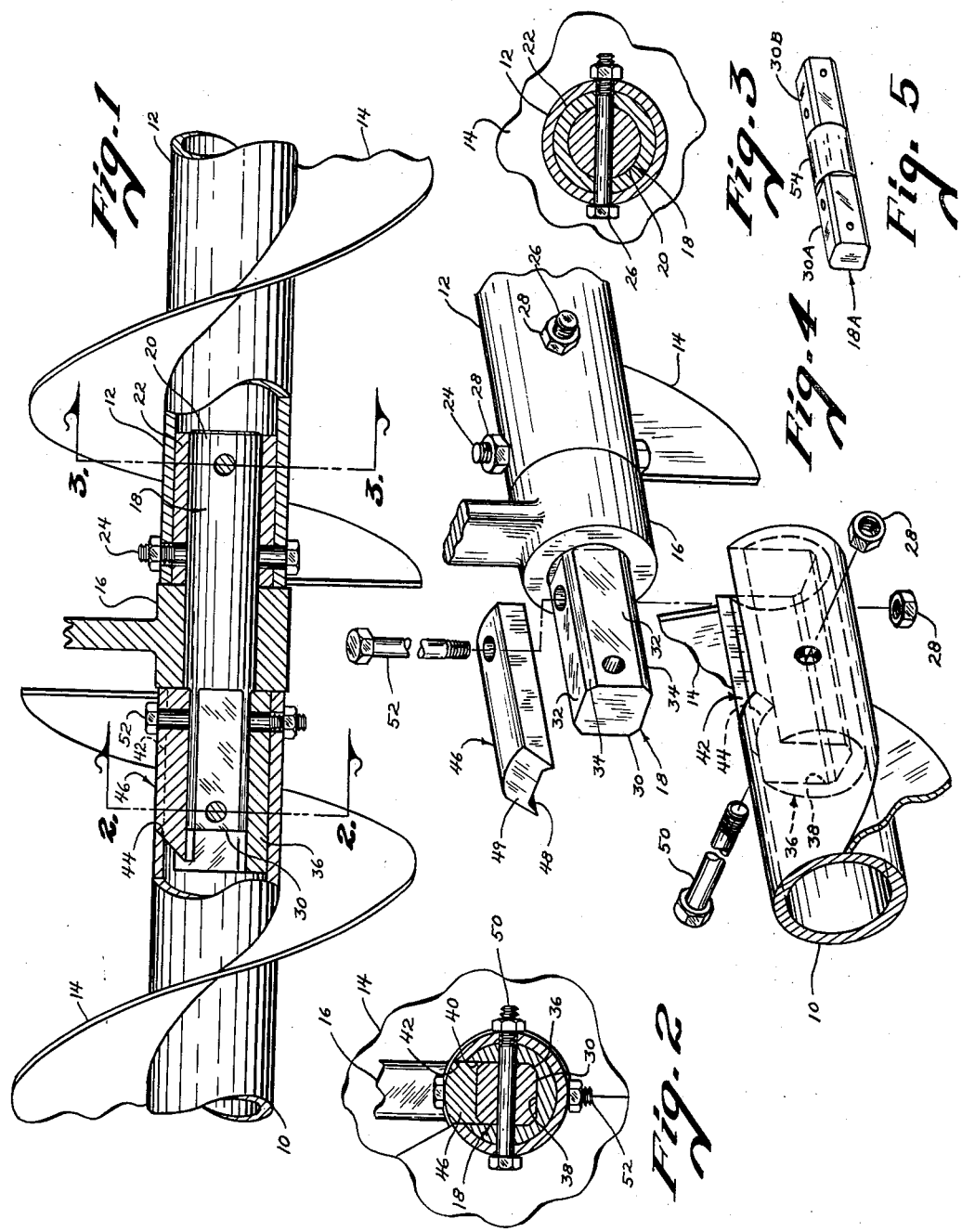
WITNESS
NORMAN G. TRAVISS
INVENTORS
ALLISON L. DOUGHERTY
RUDOLPH G. MILLS MILOSEVICH
BY Talbert Dick & Zarley
ATTORNEYS Sept. 24, 1963     A. L. DOUGHERTY ETAL     3,104,757
SCREW CONVEYOR COUPLING Filed Oct. 20, 1960     2 Sheets-Sheet 2

INVENTORS
ALLISON L. DOUGHERTY
RUDOLPH G. MILLS MILOSEVICH
BY Talbott Click & Farley
ATTORNEYS

WITNESS
NORMAN G. TRAVISS

United States Patent Office 3,104,757
Patented Sept. 24, 1963

3,104,757
SCREW CONVEYOR COUPLING
Allison L. Dougherty, 2518 Kenway Drive, and Rudolph
G. Mills Miiosevich, 3815 15th St., both of Des
Moines, Iowa
Filed Oct. 20, 1960, Ser. No. 63,751
9 Claims. (Cl. 198—213)

Our invention relates to conveyer equipment and more particularly to a coupling means for shafts of the screw-type conveyer.

The art of material handling often employs a plurality of rotary screws coupled together in sections to form a screw of the desired length. The screw is positioned within a trough-like housing and is supported therein by suitable bearing means between the screw sections. These bearing means are usually suspended from a bracket means which is secured to the trough-like housing. Rotary power is supplied to the screws which thereupon act upon material in the housing to carry the material to the desired discharge point.

Many different types of conveyer shaft couplings have been employed through the years to secure sections of rotary screws together. Nevertheless, the existing couplings known to us are many times inefficient and invite excessive wear on both the coupling and bearings. It is also often difficult to remove one section of rotary screw without also disturbing the other sections and bearings.

Therefore, the principal object of our invention is to provide a screw conveyer coupling that will efficiently transmit torque from one auger or screw shaft to another.

A further object of our invention is to provide a coupling for screw conveyers that will distribute the shearing forces among its various parts to reduce the wear on any one component.

A still further object of our invention is to provide a coupling for screw conveyers that will permit the easy removal of one conveyer without substantially disturbing the other screw sections of the unit.

A still further object of our invention is to provide a coupling for screw conveyers that will prevent vibration of the coupling and two conveyers at the point of juncture.

A still further object of our invention is to provide a coupling for screw conveyers that is economical of manufacture and durable in use.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

FIG. 1 is a partial sectional view of our device at the bearing point where two shafts are joined;

FIG. 2 is a sectional view of our device taken on line 2—2 of FIGS. 1 and 6;

FIG. 3 is a sectional view of our device taken on line 3—3 of FIG. 1;

FIG. 4 is a schematic perspective view of our device showing the various components thereof;

FIG. 5 is a perspective view of an alternate form of our device;

Figure 6:
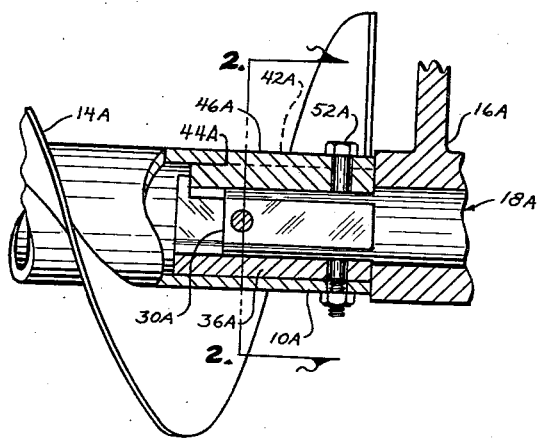
FIG. 6 is a sectional view of an alternate form of our device.
Figure 7:
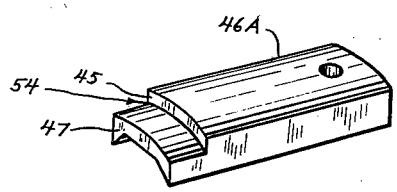
FIG. 7 is a perspective view of the cap element shown in FIG. 6.

We have used the numerals 10 and 12 to designate two hollow auger shafts with helical flighting 14 thereon. Shafts 10 and 12 are normally mounted in an elongated trough-like housing and bearing member 16 is normally suspended from the top of the housing by any convenient bracket. We have not shown details of either the housing or the bracket in our drawings as they do not constitute a part of our invention. We have shown the outside diameter of bearing member 16 to be similar to that of shafts 10 and 12 but the outside diameter of the bearing element is not critical.

A circular stud shaft 18 is rotatably mounted within bearing member 16 as shown in FIG. 1. One end 20 of stud shaft 18 can extend from bearing member 16 and can retain the circular cross-sectional shape as that portion of the shaft within the bearing member. A hollow circular bushing 22 having an inside diameter equal to the outside diameter of the end 20 of stud shaft 18 is mounted on the end 20 of the stud shaft as shown in FIG. 1. The outside diameter of bushing 22 is substantially equal to the inside diameter of shaft 12, and, as shown in FIG. 1, the bushing is received into the hollow end of shaft 12. Two sets of registering holes are located in the joined shaft 12, bushing 22, and end 20 of stud shaft 18 to receive bolts 24 and 26, respectively. These two sets of registering holes are so positioned that the longitudinal axis of each of the bolts 24 and 26 are perpendicular to the longitudinal axis of shaft 12 and are also perpendicular to each other although they dwell in parallel planes. Nuts 28 on bolts 24 and 26 can hold the above described components together so that the shaft 12 is supported by stud shaft 18 within bearing 16.

The end 30 of stud shaft 18 opposite to end 20 thereof protrudes from bearing 16. End 30 is substantially square in cross section and has four flat surfaces 32 which are separated at the corners by portions 34 which represent the original exterior circular surface of the stud shaft 18. A bushing element 36 has a slot 38 with an inner shape complementary to the end 30 of stud shaft 18. As shown in FIGS. 2 and 4, the end 30 of the stud shaft is received into the slot 38 of bushing 36, and the sides 40 of slot 38 communicate with the exterior surface of the bushing. The exterior diameter of bushing element 36 coincides with the inside diameter of shaft 10 and can be mounted within the shaft as shown in FIGS. 1 and 2.

Shaft 10 has a slot 42 cut in its exterior surface adjacent one end thereof and the end 44 of slot 42 is tapered inwardly toward the center of the shaft and away from the end of the shaft. The end 44 represents a straight flat plane but presents an arcuate edge on the periphery of shaft 10 which will always result at the intersection of an inclined flat plane and a cylindrical surface. The width of slot 42 is the same as the width of slot 38 in bushing element 36. A bushing cap 46 has a width substantially the same as slots 38 and 42 and is adapted to be mounted therein as shown in FIGS. 1, 2 and 4. The bottom surface 48 of cap 46 is complementary to one exposed surface of end 30 on stud shaft 18 and fits down over one of the flat portions 32 and two of the round portions 34 on end 30. The cap 46 then extends upwardly past the top of bushing element 36 and terminates in a top portion which dwells in the circular plane of the exterior surface of shaft 10. The end 49 of cap 46 farthest from the end of shaft 10 is tapered in the same manner as end 44 in slot 42 and engages end 44 when mounted in the above described position. Cap 46 thereupon terminates at the end of shaft 10 as shown in FIG. 1. Shaft 10, bushing element 36 and end 30 on stud shaft 18 have one set of registering holes to receive bolt 50 which is disposed similarly to the previously described bolt 26. A second set of registering holes in cap 46, end 30 of stud shaft 18, bushing 36 and shaft 10, receives bolt 52 which is disposed similarly to the previously described bolt 24. Nuts 28 hold bolts 50 and 52 in position within these elements.

In FIG. 5 we have shown a stud shaft 18A which has circular center portion 54 which is similar to the portion of stud shaft 18 which is within bearing 16. One end 30A of stud shaft 18A is identical to end 30 of stud shaft 18. The end 30B of stud shaft 18A is identical to end 30A but in a reversed position. Ends 30A and 30B have proper bolt holes to receive bolts similar to bolts 24, 26, 50 and 52.

In FIG. 6 we have shown an alternate form of our device. This figure is similar to the left-hand portion of FIG. 1. Elements 14A, 52A, 16A, 18A, 30A, and 36A in FIG. 6 are identical to elements 14, 52, 16, 18, 30 and 36, respectively, in FIG. 1. The end 44A in slot 42A of shaft 10A is not tapered as was the case of end 44 in slot 42 of shaft 10. End 44A is square and is adapted to engage and abut shoulder 45 on cap 46A. Furthermore, cap 46A has a lip 47 that is immediately below shoulder 45 which extends beyond the shoulder and which is received within the interior diameter of shaft 10A. Shoulder 45 and lip 47 provide a notch opening 54 which is adapted to receive the end 44A of slot 42A in shaft 10A. A transverse sectional view of the apparatus in FIG. 6 is shown in FIG. 2 and is identical to a similar view of the elements in FIG. 1.

When our device is installed as shown in FIGS. 1 and 2, and rotational power is imparted to shaft 12, rotation is induced to stud shaft 18 through bolts 24 and 26 which secure shaft 12 to stud shaft 18. As the squared end 30 of stud shaft 18 rotates, it imposes rotational motion to shaft 10 through bolts 50 and 52. However, torque is also transmitted to shaft 10 by stud shaft 18 through the flat surfaces 32 of end 30 of the stud shaft which imposes rotational motion on the sides 40 of slot 38 in bushing element 36. As viewed in FIG. 2, the upper portions of sides 40 of slot 38 in bushing element 36 engage the lower side portions of bushing cap 46 to impart rotational movement thereto. Bushing cap 46 thereupon engages the sides of slot 42 in shaft 10 so that torque is being applied to shaft 10 by the bushing cap as well as by bolts 50 and 52. In fact, the squared end 30 of stud bolt 18 can transmit torque to shaft 10 through bushing element 36 and bushing cap 46 without any bolts 50 or 52, but the presence of the bolts relieves the tremendous force reaction on the sides of slot 42 in shaft 10, and conversely, the bushing cap and related structure relieve the shearing stresses on bolts 50 and 52. It is obvious that torque can be transmitted through our coupling device in the manner described regardless of whether the source of rotational power is imparted to shaft 10 or shaft 12.

Stud shaft 18A merely represents the stud shaft component used when the structure on the end of shaft 10 in FIG. 1 is reversed and duplicated on the end of shaft 12.

Since tangential forces are being exerted upon bushing cap 46, and since it is secured in place by only one bolt 52, the cap might have a tendency to permit some vibration within the tolerances of the respective components were it not for the fact that its tapered end 49 engages the tapered end 44 of slot 42 in shaft 10. As viewed in FIG. 1, cap bushing 46 cannot move outwardly from the center of shaft 10 when bolt 52 holds the respective tapered portions 49 and 44 of the bushing cap and shaft 10, respectively, in engagement with each other. The notch 54 in cap 46A serves the same general function as the tapered portions 49 and 44 in the structure of FIG. 1 when the notch receives the square end 44A in slot 42A of shaft 10A. As contrasted to end 44 of slot 42 in shaft 10, end 44A is more economically fabricated than the tapered end 44.

It is seen that if bolts 50 and 52 are removed from shaft 10 in FIG. 1, and bushing cap 46 is thereupon removed from slots 42 and 38, shaft 10 can be lowered to a position of disengagement with end 30 on stud shaft 18. Thus, shaft 10 can be uncoupled without bothering shaft 12. When stud shaft 18A is utilized, either shaft 10 or 12 can be disengaged from each other in the manner described without disturbing the other shaft. Both ends of stud shaft 18A can therefore be operated in conjunction with a bushing element 36, bushing cap 46 and auger shaft 10 in the same manner as end 30 on stud shaft 18 operated with these elements. It is obvious that whenever the end of the slot in a pipe is square, as is end 44A in slot 42A of shaft 10A, cap 46A may be used just as cap 46 in conjunction with either of stud shafts 18 or 18A.

Therefore, it is seen that our device will accomplish at least all of the stated objectives.

Some changes may be made in the construction and arrangement of our screw conveyer coupling without departing from the real spirit and purpose of our invention, and it is our intention to cover by our claims, any modified forms of structure or use of mechanical equivalents which may be reasonably included within their scope.

We claim:

1. In combination, a hollow screw conveyer shaft, an elongated slot adjacent the end of said conveyer shaft, a bushing in the hollow end of said conveyer shaft, an elongated slot in said bushing element communicating with said elongated slot in said conveyor shaft, a stud shaft within said bushing element and having an outer end extending beyond the end of said screw conveyer shaft, means on the outer end of said stud shaft to secure said stud shaft to a second hollow screw conveyer shaft, a bushing cap substantially filling the slots in said conveyer shaft and said bushing element, interlocking surfaces on said conveyer shaft and cap to prevent the radial displacement of said cap from said conveyer shaft and said bushing, and means for securing together said conveyer shaft, said stud shaft, said bushing element, and said bushing cap.

2. In combination, a hollow screw conveyer shaft, an elongated slot adjacent the end of said conveyer shaft, a bushing in the hollow end of said conveyer shaft, an elongated slot in said bushing element communicating with said elongated slot in said conveyer shaft, a stud shaft within said bushing element and having an outer end extending beyond the end of said screw conveyer shaft, means on the outer end of said stud shaft to secure said stud shaft to a second hollow screw conveyer shaft, a bushing cap substantially filling the slots in said conveyer shaft and said bushing element, interlocking surfaces on said conveyer shaft and cap to prevent the radial displacement of said cap from said conveyer shaft and said bushing, and means for securing together said conveyer shaft, said stud shaft, said bushing element, and said bushing cap; said slot in said bushing element being substantially rectangular in cross-section and the portion of said stud shaft within said bushing element being substantially square in cross section.

3. In combination, a hollow screw conveyer shaft, an elongated slot adjacent the end of said conveyer shaft, a bushing in the hollow end of said conveyer shaft, an elongated slot in said bushing element communicating with said elongated slot in said conveyer shaft, a stud shaft within said bushing element and having an outer end extending beyond the end of said screw conveyer shaft, means on the outer end of said stud shaft to secure said stud shaft to a second hollow screw conveyer shaft, a bushing cap substantially filling the slots in said conveyer shaft and said bushing element, interlocking surfaces on said conveyer shaft and cap to prevent the radial displacement of said cap from said conveyer shaft and said bushing, and means for securing together said conveyer shaft, said stud shaft, said bushing element, and said bushing cap; at least one end of said bushing cap and said slot in said conveyer shaft having tapered exterior surfaces in engagement with each other.

4. In combination, a hollow screw conveyer shaft, an elognated slot adjacent the end of said conveyer shaft;

the inner end of said elongated slot being tapered inwardly toward the center axis of said conveyer shaft and away from the end of said conveyer shaft; a bushing in the hollow end of said conveyer shaft, an elongated slot in said bushing element communicating with said elongated slot in said conveyer shaft, a stud shaft within said bushing element and having an outer end extending beyond the end of said screw conveyer shaft, means on the outer end of said stud shaft to secure said stud shaft to a second hollow screw conveyer shaft, a bushing cap substantially filling the slots in said conveyer shaft and said bushing element, and means for securing together said conveyer shaft, said stud shaft, said bushing element, and said bushing cap; said bushing cap having its inner end tapered to engage the tapered end of said slot in said conveyer shaft.

5. In combination, a hollow screw conveyer shaft, an elongated slot adjacent the end of said conveyer shaft, a bushing in the hollow end of said conveyer shaft, an elongated slot in said bushing element communicating with said elongated slot in said conveyer shaft, a stud shaft within said bushing element and having an outer end extending beyond the end of said screw conveyer shaft, a bushing cap substantially filling the slots in said conveyer shaft and said bushing element, interlocking surfaces on said conveyer shaft and cap to prevent the radial displacement of said cap from said conveyer shaft and said bushing, and means for securing together said conveyer shaft, said stud shaft, said bushing element and said bushing cap; the outer end of said stud shaft adapted to receive a bushing element, bushing cap and conveyer shaft of the same character as the other end of said stud shaft.

6. In combination, a hollow screw conveyer shaft, an elongated slot adjacent the end of said conveyer shaft, a bushing in the hollow end of said conveyer shaft, an elongated slot in said bushing element communicating with said elongated slot in said conveyer shaft, a stud shaft within said bushing element and having an outer end extending beyond the end of said screw conveyer shaft, means on the outer end of said stud shaft to secure said stud shaft to a second hollow screw conveyer shaft, a bushing cap substantially filling the slots in said conveyer shaft and said bushing element, and means for securing together said conveyer shaft, said stud shaft, said bushing element, and said bushing cap; said slot in said bushing element being substantially rectangular in cross-section and the portion of said stud shaft within said bushing element being substantially square in cross section; the outer end of said stud shaft being substantially square in cross section and adapted to receive a bushing element, a bushing cap and conveyer shaft of the same character as the other end of said stud shaft.

7. In combination, a hollow screw conveyer shaft, an elongated slot adjacent the end of said conveyer shaft, a bushing in the hollow end of said conveyer shaft, an elongated slot in said bushing element communicating with said elongated slot in said conveyer shaft, a stud shaft within said bushing element and having an outer end extending beyond the end of said screw conveyer shaft, means on the outer end of said stud shaft to secure said stud shaft to a second hollow screw conveyer shaft, a bushing cap substantially filling the slots in said conveyer shaft and said bushing element, means for securing together said conveyer shaft, said stud shaft, said bushing element, and said bushing cap; said slot in said bushing element being substantially rectangular in cross-section and the portion of said stud shaft within said bushing element being substantially square in cross section; the outer end of said stud shaft being substantially square in cross section and adapted to receive a bushing element, a bushing cap and conveyer shaft of the same character as the other end of said stud shaft, and a portion of said stud shaft being circular in cross section at a point in between its two ends.

8. In combination, a hollow screw conveyer shaft, a straight elongated slot having straight sides adjacent the end of said conveyer shaft; the inner end of said elongated slot being square with respect to the sides thereof; a bushing in the hollow end of said conveyer shaft, an elongated slot in said bushing element communicating with said elongated slot in said conveyer shaft, a stud shaft within said bushing element and having an outer end extending beyond the end of said screw conveyer shaft, means on the outer end of said stud shaft to secure said stud shaft to a second hollow screw conveyer shaft, a bushing cap substantially filling the slots in said conveyer shaft and said bushing element, and means for securing together said conveyer shaft, said stud shaft, said bushing element, and said bushing cap; said bushing cap having a notch in its end to receive the square end of said elongated slot in said conveyer shaft, a lip portion on said notch extending beyond and under the square end of said elongated slot to engage the inner periphery surface of said conveyer shaft.

9. In combination, a hollow screw conveyer shaft, an elongated slot adjacent the end of said conveyer shaft, a bushing in the hollow end of said conveyer shaft, an elongated slot in said bushing element communicating with said elongated slot in said conveyer shaft, a stud shaft within said bushing element and having an outer end extending beyond the end of said screw conveyer shaft, means on the outer end of said stud shaft to secure said stud shaft to a second hollow screw conveyer shaft, a bushing cap substantially filling the slots in said conveyer shaft and said bushing element, and means for securing together said conveyer shaft, said stud shaft, said bushing element, and said bushing cap; at least one end of said bushing cap and said slot in said conveyer shaft having interlocking engaging surfaces to prevent the movement of that end of said cap in a radial direction from the center of said conveyer shaft.

References Cited in the file of this patent
UNITED STATES PATENTS

| | | |
|---|---|---|
| 408,953 | Chivill | Aug. 13, 1889 |
| 893,143 | Caldwell | July 14, 1908 |
| 1,158,844 | Price | Nov. 2, 1915 |
| 2,849,105 | Touton | Aug. 26, 1958 |